United States Patent [19]

Zulick, III et al.

[11] Patent Number: 5,303,900

[45] Date of Patent: Apr. 19, 1994

[54] PLASTIC SECURITY HANDRAIL SYSTEM AND CONNECTORS THEREFOR

[76] Inventors: James E. Zulick, III, 9312 Cabot Ct., Baltimore, Md. 21237; William F. Appler, 16 Shadowbrook Ct., Laurel, Md. 20723

[21] Appl. No.: 818,034

[22] Filed: Mar. 2, 1992

[51] Int. Cl.⁵ .................................. E04H 17/00
[52] U.S. Cl. ................................. 256/65; 256/19; 403/237; 403/191
[58] Field of Search .............. 256/19, 65; 403/237, 403/234, 191; 285/53-55, 331

[56] References Cited

U.S. PATENT DOCUMENTS

| | | | |
|---|---|---|---|
| 481,912 | 8/1892 | Noll | 285/53 |
| 1,463,461 | 7/1923 | Davis | 285/55 |
| 2,242,427 | 5/1941 | Heanue | 256/65 |
| 2,370,193 | 2/1945 | Reid | 285/55 |
| 2,557,002 | 6/1951 | Lathrop | 256/65 |
| 2,834,621 | 5/1958 | Schroer . | |
| 3,353,853 | 11/1967 | Heywood . | |
| 3,362,717 | 1/1968 | Bram | 285/55 |
| 3,471,182 | 10/1969 | Schroer . | |
| 3,787,033 | 1/1974 | Snyder . | |
| 3,804,542 | 4/1974 | Hammerschmidt . | |
| 4,053,140 | 10/1977 | Clemens . | |
| 4,101,226 | 7/1978 | Parisien . | |
| 4,269,532 | 5/1981 | Sorrentino | 403/191 |
| 4,461,461 | 7/1984 | Caron . | |
| 4,892,292 | 1/1990 | Russell . | |
| 4,930,754 | 6/1990 | Caron . | |
| 4,952,092 | 8/1990 | Ballerstein . | |
| 4,953,830 | 9/1990 | Weaver | 256/65 |
| 5,170,996 | 12/1992 | Venegas | 256/65 |

FOREIGN PATENT DOCUMENTS 819147 10/1951 Fed. Rep. of Germany ........ 256/65
683386 11/1952 United Kingdom .

Primary Examiner—Randolph A. Reese
Assistant Examiner—Anthony Knight
Attorney, Agent, or Firm—Aquilino & Welsh

[57] ABSTRACT

A plastic security handrail system made with lightweight, high strength, non-corrosive plastic pipe having a plurality of elongated spaced rails mounted between end supports. A plurality of individual coped sections are held together by a compression force to form center posts spaced from the end supports. The system includes coped fitting joint connectors for perpendicular connections between rails and posts and rabbeted joint connections for connecting various rail sections together to form a rigid, strong railing system for a wide variety of uses.

23 Claims, 3 Drawing Sheets

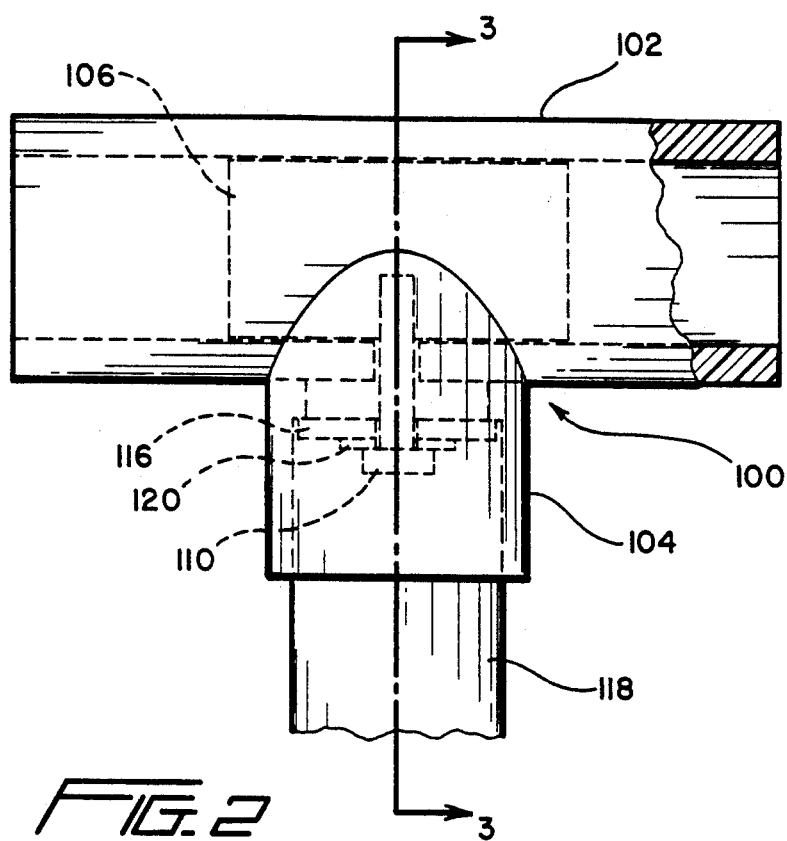
FIG. 2
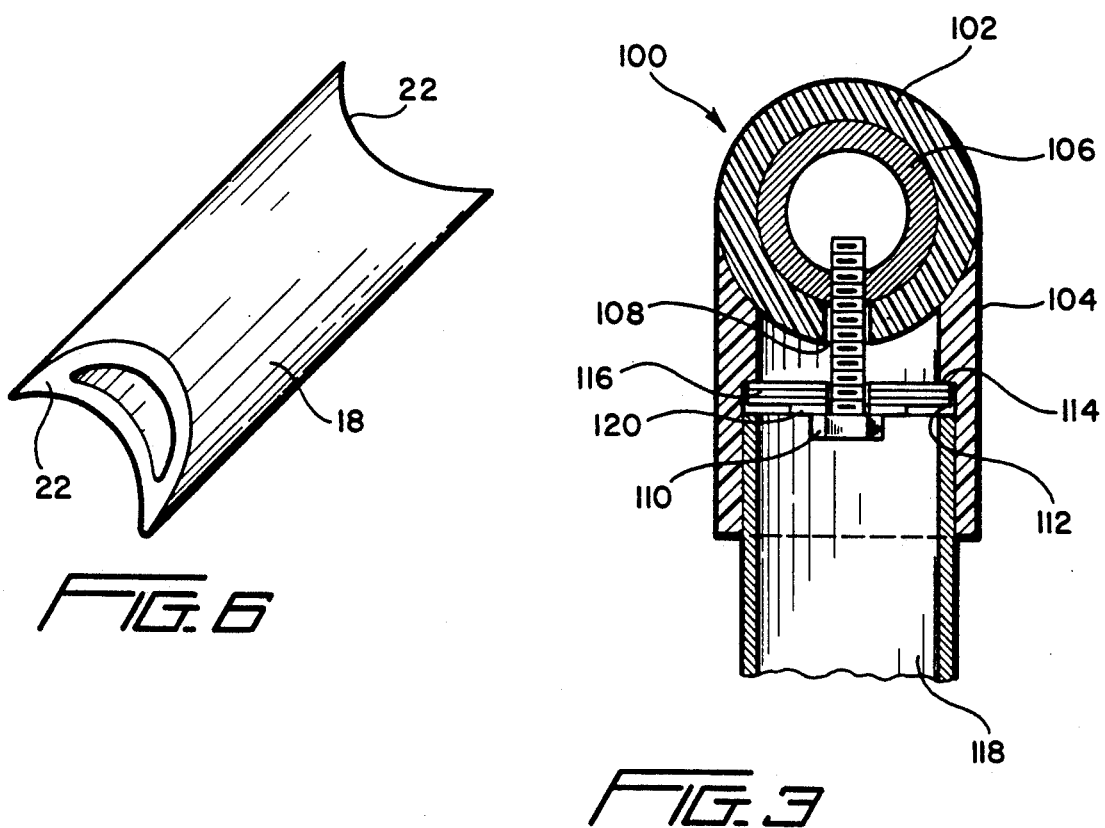
FIG. 6
FIG. 3

PLASTIC SECURITY HANDRAIL SYSTEM AND CONNECTORS THEREFOR

BACKGROUND AND SUMMARY OF THE INVENTION

The present invention relates to a reinforced plastic handrail security system and more particularly to a handrail system having improved interconnections.

Security railings have long been used for a variety of applications, such as multi-story buildings with stairways and balconies, industrial buildings, playgrounds and schools, among any number of others of a wide variety of uses. Many of these uses are outdoors, where the security railing is exposed to the weather and other corrosive elements, such as salt water, chemical vapors, and the like. Building codes require the use of high-strength materials, such as iron, steel, aluminum and the like to provide the sufficient rigidity and strength to ensure adequate security qualities, and these types of railing systems often present a problem of rusting and/or corrosion of the metallic parts. In addition to the corrosion being unsightly and requiring constant care and upkeep, the corrosion of the security railing often degrades the strength and security aspects of the railing to the point where they no longer function for their intended purpose. This is particularly true with outdoor railings used in highly corrosive environments.

In an attempt to overcome these problems, a number of fence systems made out of plastic have been proposed by the prior art. For example, U.S. Pat. No. 4,053,140 to Clemens et al. is directed to a non-corrosive plastic handrail system used for stairways, platforms and the like in corrosive environments where the strength of the system depends upon the use of a thermosetting resin and high-tensile strength reinforcing fibers. U.S. Pat. No. 4,461,461 to Caron teaches the use of a laminated railing formed from a polyvinyl chloride pipe using a laminated structure of two types wherein a smaller pipe has an outside diameter essentially equal to the inside diameter of the larger pipe.

Another Caron U.S. Pat. No. 4,930,754, relates to a similar polyvinyl chloride pipe handrail security system using a specific arrangement of fittings and cylindrical joint aligners made out of a solid cylinder of PVC which extends across each joint.

Other security railing systems are disclosed in the U.S. Pat. Nos. to Schroer (2,834,621), Heywood (3,353,853), Schroer (3,471,182), Snyder et al. (3,787,033), Hammerschmidt (3,804,542), Parisien (4,101,226), Russell (4,892,292), Ballerstein (4,952,092) and Evans et al. (GB 683,386), among others, which use specific joint connectors.

One of the shortcomings of the prior art rail systems of the type described above is the requirement for a plurality of joint connectors in order to provide the sufficient strength and rigidity to meet the code requirements for security railings. The use of many joints and shorter sections of rail tend to be aesthetically undesirable, particularly where the railings are used in home or retail store environments.

The present invention relates to a reinforced plastic railing using elongated rails and posts formed of a plurality of coped interconnecting sections. The features of the system include the use of unique joints for connecting the reinforced rails which ensures continuity in design and strength.

Among the objects of the present invention are the provision of an improved plastic reinforced handrail security system having elongated rails providing an aesthetically pleasing appearance while maintaining the requisite strength and rigidity required by building codes; the provision of a handrail security system which requires little maintenance and resists the efforts of a corrosive environment; the provision of a handrail security system using elongated rail members, coped posts and unique interconnection joints.

Other objects and advantages of the invention will be set forth in part in the description which follows, and in part will be obvious from the description, or may be learned by the practice of the invention. The objects and advantages will be realized and attained by means of the elements and combinations particularly pointed out in the appended claims.

The accompanying drawings, which are incorporated in and constitute a part of this specification, illustrate a preferred embodiment of the invention, and together with the description, serve to explain the principles of the invention.

DESCRIPTION OF THE DRAWINGS

FIG. 2 shows an elevational view, partly in section, of a coped joint connector used with the present invention.

FIG. 3 is a sectional view taken along line 3—3 of FIG. 2.

FIG. 6 is a detail of the rail security system of FIG. 1.

DESCRIPTION OF THE PREFERRED EMBODIMENTS

Figure 1:
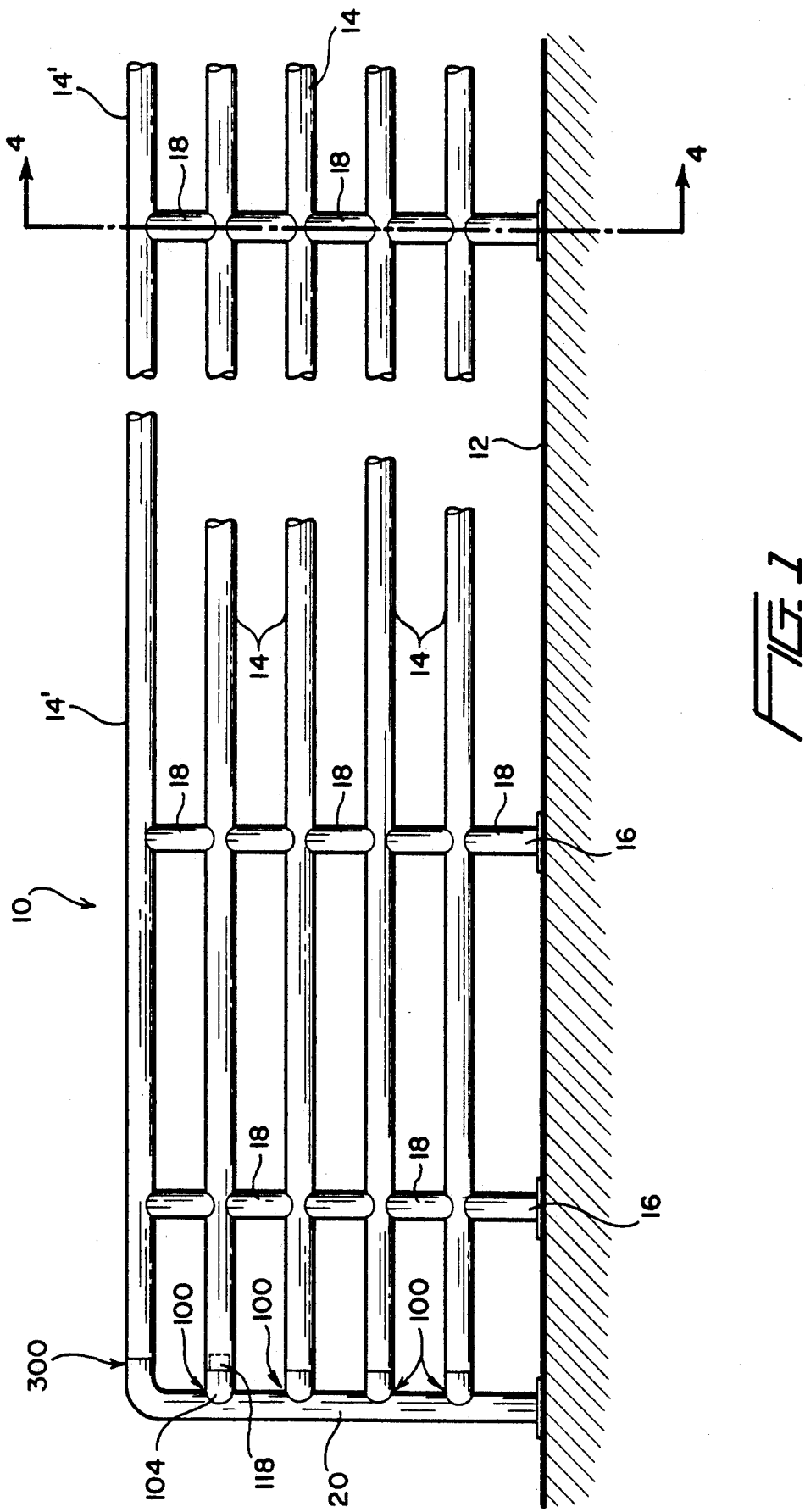
FIG. 1 shows an elevational view partly in section of a rail security system in accordance with the present invention.

FIG. 1 illustrates a typical plastic security handrail system 10 in accordance with the present invention. The security railing 10 is installed on a support surface 12 which can be a wood or concrete deck, or any other home, commercial or industrial site where railings are used. Several sections of the railing are shown with at least two of the adjoining sections being broken off, it being appreciated that any number of sections can be joined together depending upon the size of the area where the rail system is to be installed. The rail units and the posts are made of tubular plastic material, preferably polyvinyl chloride plastic pipe and/or tubing. It is contemplated that the pipe/tubing may be suitably reinforced with fibers or the like in accordance with known state-of-the-art techniques wherein additional strength and/or rigidity is required. The pipes may have a smooth, gloss, satin or matte finish, and may be made in a variety of colors by adding pigment to the extrusion material. Typically, a size of PVC pipe found suitable for the present invention would have an outside diameter of approximately two inches and having a wall thickness of at least one-quarter inch, although smaller and larger size tubing may be used with the present invention. The polyvinyl chloride material is impervious to corrosive environments such as salt, spray, rain, snow and extreme heat as well as corrosive chemical atmospheres. Preferably, the pipe is fire-resistant and resistant to denting, scratching and other physical abuse.

A novel feature of the present invention resides in the use of elongated, rails 14 supported by a series of center posts 16. Normally, the rails are horizontal with respect to the ground or a support surface, as shown, but they may be angularly disposed if used on a ramp or stair, for example, or curved or otherwise shaped in keeping within the scope of the invention. The rails 14 may be unitary up to lengths so desired or be formed in sectional units having periodic seams which are subsequently welded or glued together. When seams are used, they are normally located adjacent the vertical center posts for added stability. The connected seams have the same strength and appearance as a continuous rail when in place.

This arrangement provides sufficient mechanical strength to meet the most stringent building code requirements for residential, commercial and industrial applications, while maintaining an aesthetically pleasing appearance because of the long, continuous rails without a number of unsightly connections between the rails. Thus, the railings flow with the symmetry of the building or other environment that they are used with, without sacrificing the strength and rigidity required by the codes. The rails 14 may connect directly to a wall surface or any other static structure, but as shown, the rails terminate in end posts 20 which are formed of a single vertical pipe reinforced and permanently attached to the support surface 12. The rails 14 are attached to the end posts using connectors 100, as described hereinbelow. Each center post 16 is constructed of a plurality of individually coped sections 18 which are structured to fit between the rails 14. The coped sections 18 are connected together by providing a compression force using a connector, as described hereinbelow, or by providing a permanent bond between the sections 18 and the rails 14 using an ultrasonic weld or glue joint, for example. It will be appreciated that end posts 20 made with a permanent bond are manufactured in situ or are made with short sections of rails for subsequent connections to longer rails at the site.

A typical coped section 18 is shown in FIG. 6, wherein both ends are coped. The ends 22 of the section are saddle-shaped, which shape is complementary to the exterior contour of the rails 14 to which the coped section 18 abuts to provide a smooth tight connection between the parts when they are held together as described hereinbelow. Typically, the radius of the saddle-shaped ends 22 is the same as the radius of the rails 14.

Figure 4:
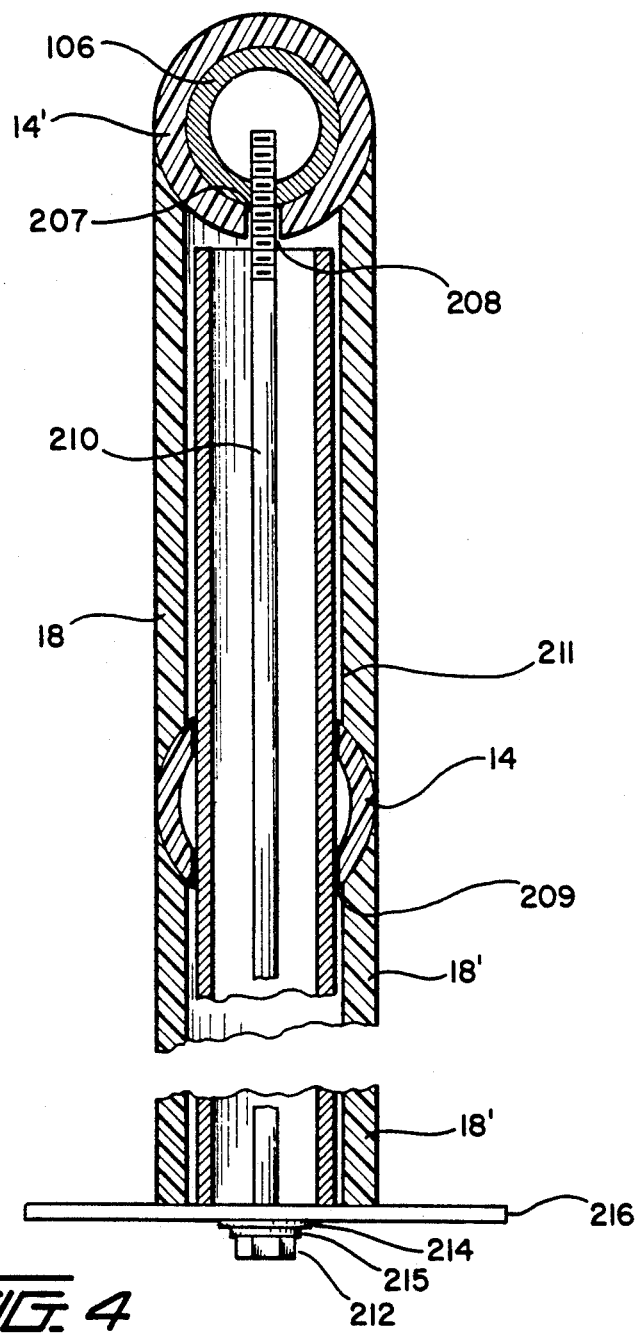
FIG. 4 is a sectional view of a vertical post of the present invention, taken along line 4—4 of FIG. 1.

FIG. 4 shows a typical formation of a center post 16 having a plurality of individually double ended coped sections 18, and a base coped section 18' which is only coped on one end. The double ended coped sections 18 fit between the rails 14 and 14' in order to maintain the spacing therebetween. The top rail 14' is provided with a metal reinforcing sleeve 206 which may be inserted within the rail 14' adjacent the location of center post 16 only or throughout the length of the rail 14'. The top rail 14' has a bore opening 208 to accommodate a threaded rod 210. The sleeve 206 has a tapped bore 207 to receive the threaded rod 210 to form a connection therewith. Typically, a one-quarter inch diameter rod has been found to be of sufficient strength and rigidity to maintain a suitable connection, however, it will be appreciated that any sized rod may be used as long as it has sufficient strength for the particular application for which it is used. In any particular installation, the threaded rod 210 extends the entire vertical height of the railing for which it is used. The opposite end of the threaded rod 210 terminates in a suitable nut 212, washer 214 and lock washer 215, and is connected directly to a mounting plate 216 as shown. Typically, the mounting plate is used to secure the center post 16 to a wooden, steel other similarly structured support surface using threaded fasteners or similar fasteners to provide the required rigidity. Other typical mounting arrangements may be used. For example, the lower section of the center post may be mounted in concrete in a sleeve or mounted in a core drill hole. These and other well-known mounting means may be used in keeping within the scope of the present invention.

It will be appreciated that the coped sections 18 abut against the rails 14 and 14' when they are connected and that the compression forces created by the threaded rod 210 being threaded into the bore of the sleeve 206 is sufficient to provide sufficient rigidity to keep the sections together. As will be further appreciated, each of the rails 14 and 14' may include openings 208 of a size sufficient to accomodate the threaded rod 210 as can be seen in rail 14' in FIG. 4, however, if a reinforcing sleeve 211 is to be used, the rails may require larger sized openings 209. Reinforcing sleeve 211, as shown, engages top rail 14' but it may optionally engage sleeve 206.

Referring to FIGS. 2 and 3, a typical coped joint connection 100 is shown for connecting the coped end of a pipe/tubing to a cylindrical section of the system. A first length of rail 102 of tubular plastic pipe of the type described hereinabove is fitted with a coped fitting joint connector 104. While the rail 102 is shown as a short section, it will be appreciated that such a rail may be an elongated rail 14 of the type shown in FIG. 1 or a vertical end rail 20 of the type shown in FIG. 1. The rail 102 is provided with an internal reinforcement insert 106, which is preferably manufactured from metal, the outside diameter of which corresponds to the inner diameter of the rail 102. The rail 102 includes a bore opening 108 to receive a threaded fastener 110. The threaded fastener is connected directly to the reinforcement insert 106 using a threaded bore (not shown) formed in the reinforcement insert 106 into which the threaded fastener is screwed. The coped fitting joint connector 104 is formed with an internal rabbet 112 having a shoulder 114. At least one and preferably two washers 116 are fit onto the threaded fastener 110 and the peripheral edges of the washers 116 abut the shoulder 114 of the internal rabbet 112. With the coped fitting 104 placed against the cylindrical side of the rail 102 and the washers 116 in place on the shoulder 114 of the rabbet 112, the threaded fastener 110 is inserted through the opening 108 into a threaded bore in the reinforcement insert 106. Continued rotation of the threaded fastener 110 draws the coped fitting joint connector 104 snugly against the rail 102 since it is pulled by the washers 116 abutting the shoulder 114 of the rabbet 112. When the threaded fastener 110 is tightened, a secure connection is made.

An inner, rigid joint sleeve 118, the outside diameter of which corresponds to the inner diameter of the rabbet 112 on the coped fitting joint connector 104, may be inserted into the rabbeted area in the coped fitting 104 in order to permit connection of additional sections of elongated railing. For example, as shown in FIG. 1, a series of rails 14 abut coped fittings 104 so as to matingly engage inner joint sleeve 118 of the type shown in FIG. 3. In turn, the coped fitting joint connector 104 connects the rail 14 to the end post 20 to form a coped joint connection 100.

Figure 5:
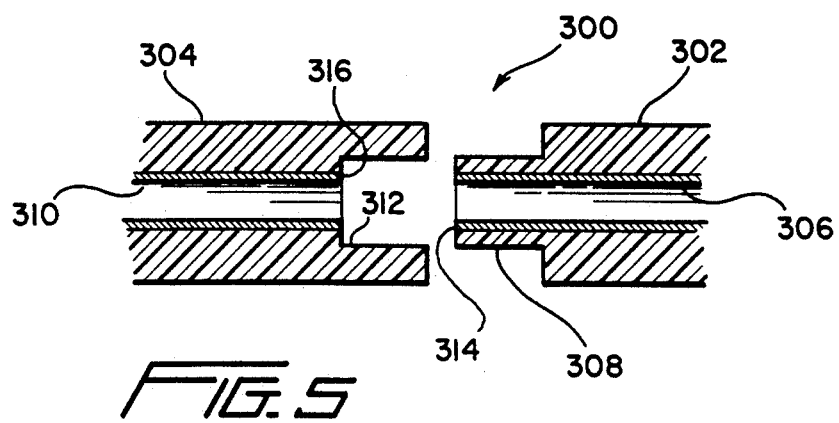
FIG. 5 is a sectional view of another connector used with the present invention.

A rabbet connection 300 is shown in FIG. 5 for connecting a first section 302 of plastic railing and a second section 304 of plastic railing. Section 302 of plastic railing includes an internal rigid steel reinforcement sleeve 306. The end of the section 302 is provided with an outer annular milled surface 308. The second section 304 is provided with an internal rigid reinforcement sleeve 310 and is provided with an internal annular milled surface 312. The outer and inner milled surfaces fit together to form the rabbet connection 300 since the diameter of the internal milled surface 312 and the outer diameter of the external milled surface 308 are sized to provide a frictional fit therebetween. Preferably, the end 314 of the sleeve 306 and the end 316 of the sleeve 310 abut each other when the section 302 and 304 are interconnected. This connection provides sufficient rigidity so as to maintain a solid connection between the sections. Whereas an individual in-line connection is shown, it will be appreciated that a plurality of in-line connections may be used to provide a smooth, continuous railing. Furthermore, other shaped connections may be used, where appropriate, having the same type of internal and external rabbet to connect adjoining sections of steel reinforced plastic pipe.

Whereas the invention has been disclosed with a linear, or straight, horizontal and vertical rail structure, it will be appreciated by one of ordinary skill in the art that by merely altering the end surface of the coped fittings, the structures described are equally applicable to a sloped, ramped, curved, radius, or angular railing system. Furthermore, various styles of rails and vertical posts or pickets may be used in the system configuration. The joint connectors of the present invention are not limited to the specific security railing system described above, but may be used as a connector in any tubular rail system. For example, the vertical parts may be unitary rather than sectional and still use the joint connectors described hereinabove.

Still other modifications or changes may be made in the security railing system of the present invention as described above in keeping within the scope of the present invention as defined in the following claims.

We claim:

1. A security railing system comprising:
    a plurality of elongated rails;
    at least one center post spaced from the ends of said elongated rails and formed by a plurality of individual coped sections; said individual coped sections being mounted in line, one above the other and fit between adjacent spaced rails to maintain the rails spaced apart;
    means for connecting said individual coped sections to maintain the sections rigid and in line each with respect to the others;
    said means for connecting including a connecting rod having end connectors connected between a lower support surface and an upper rail, said rod and the end connections thereof providing a compressive force to maintain the coped sections rigid; and,
    wherein said rod includes a portion which is threaded to form one of said end connectors and said upper rail includes a rigid reinforcement insert having a portion which is threaded and said rod and said rail being connected together by said threaded portions cooperating with one another.

2. The security railing system of claim 1 further including end support means connecting opposite ends of said elongated rails.

3. The security railing system of claim 2 further including a plurality of coped joint connections for connecting said rails to said end support means.

4. The security railing system of claim 2 wherein said end support means includes at least one end post.

5. The security railing system of claim 2 wherein said center post further includes a rigid reinforcing sleeve formed within the individual coped sections and extending the vertical height of the center post.

6. The security railing system of claim 3 wherein said coped joint connections further include:
    a length of rail on said end support means;
    an insert for reinforcing said length of rail having an outside diameter which corresponds to an inside diameter of said rail;
    a coped fitting joint connector having at least one coped end, the shape of said coped end being structured to conform with the outside diameter of said length of rail, whereby said coped end abuts the outer portion of said rail;
    an opening in said length of rail;
    a threaded opening in said insert in alignment with said opening in said rail;
    an annular shoulder formed on an inner surface of said coped fitting joint connector; and,
    a threaded fastener and an engaging means engaging said annular shoulder whereby said threaded fastener is inserted within said rail opening and threaded into said threaded opening in said insert while said engaging means engages said annular shoulder to form a connection between said coped fitting joint connector and said rail.

7. The security railing system of claim 1 wherein said connecting means further includes a permanent bond between said individual coped sections.

8. The security railing system of claim 7 wherein said bond is a weld.

9. The security railing system of claim 7 wherein said bond is a glue joint.

10. The security railing system of claim 1 wherein said rigid reinforcement insert is in the form of a length of metal pipe.

11. The security railing system of claim 1 wherein said threaded portion of said rigid reinforcement insert is in the form of a threaded aperture.

12. A joint connection for use with a reinforced plastic railing system comprising:
    a length of rail;
    an insert for reinforcing said length of rail having an outside diameter which corresponds to an inside diameter of said rail;
    a coped fitting joint connector having at least one coped end, the shape of said coped end being structured to conform with the outside diameter of said length of rail, whereby said coped end abuts the outer portion of said rail;
    an opening in said length of rail;
    a threaded opening in said insert in alignment with said opening in said rail, an annular shoulder formed on an inner surface of said coped fitting joint connector and a threaded fastener having an engaging means associated therewith for engaging said annular shoulder whereby said threaded fastener is inserted within said opening and threaded into said threaded opening in said insert while said engaging means engages said annular shoulder to form a connection between said coped fitting joint connector and said rail.

13. The connection of claim 12 wherein said engaging means is an annular washer.

14. A post in a security railing system comprising:
a plurality of spaced rail sections;
a coped section between each adjoining pair of said rail sections;
a base coped section extending from one of said rail sections;
a rigid reinforcing sleeve sized to fit perpendicularly through said rails and coaxially within said coped section and said base coped section and thereby maintain said sections linear each with respect to the other; and
a connecting rod coaxial with said sleeve having a first end connector for connection to a support surface and a second end connector for connection to an upper fastener means.

15. The post of claim 14 wherein said upper fastener means includes a reinforcing sleeve in an upper rail member including engaging means for connectively engaging said second end connector.

16. The post of claim 15 wherein said second end connector is threaded and said engaging means is a threaded opening in said reinforcing sleeve.

17. A rabbet joint connector for connecting linear sections of elongated tubing comprising:
a first section of tubing having an outer annular milled surface;
a second section of tubing having an inner annular milled surface, the diameter of the outer annular milled surface being complementary with the diameter of the inner annular milled surface whereby said first and second sections of tubing are telescopically fit together;
a first inner rigid reinforcing sleeve positioned within and reinforcing said first section of tubing and a second inner rigid reinforcing sleeve positioned within and reinforcing said second section of tubing, wherein said reinforcing sleeves function to provide bending strength; and
wherein said reinforcing sleeves having ends which abut one other when said sections are interconnected.

18. The security railing system of claim 17 wherein said reinforcing sleeves are in the form of a length of metal tubing.

19. A security railing system comprising:
a plurality of elongated rails;
end support means connecting opposite ends of said elongated rails;
at least one center post spaced from said end support means and formed by a plurality of individual coped sections; said individual coped sections being mounted in line, one above the other and fit between adjacent spaced rails to maintain the rails spaced apart;
means for providing a compression force on said individual coped sections to maintain the sections rigid and in line each with respect to the others;
a coped joint connection for connecting said rails to said end support means including an insert for reinforcing a portion of said end support means;
a coped fitting joint connector having at least one coped end, the shape of said coped end being structured to conform with the outside surface of said end support means, whereby said coped end abuts the outer portion of said end support means;
an opening in said end support means;
a threaded opening in said insert in alignment with said opening in said end support means, an annular shoulder formed on an inner surface of said coped fitting joint connector and a threaded fastener and engaging means engaging said annular shoulder whereby said threaded fastener is inserted within said opening and threaded into said threaded opening in said insert while said engaging means engages said annular shoulder to form a connection between said coped fitting joint connector and said end support means;
and wherein said rails are connected together end to end by means of a rabbet joint connector comprising:
a first rail having an end with an outer annular milled surface;
a second section of rail having an inner annular milled surface, the diameter of the outer annular milled surface being complementary with the diameter of the inner annular milled surface whereby the milled ends of said first and second sections of said rail are telescopically fit together;
a first inner rigid reinforcing sleeve positioned within the end and reinforcing said first rail section and a second inner rigid reinforcing sleeve positioned within the end and reinforcing said second rail section; and wherein
said reinforcing sleeves each having ends which abut the other when said rail sections are interconnected.

20. The security railing system of claim 19, wherein said end support means comprises an end post.

21. A security railing system comprising:
a plurality of elongated rails;
end support means connecting opposite ends of said elongated rails;
at least one center post spaced from said end support means and formed by a plurality of individual coped sections; said individual coped sections being mounted in line, one above the other and fit between adjacent spaced rails to maintain the rails spaced apart;
means for connecting said individual coped sections to maintain the sections rigid and in line each with respect to the others;
said means for connecting said coped sections further include:
a length of rail on said end support means;
an insert for reinforcing said length of rail having an outside diameter which corresponds to an inside diameter of said rail;
a coped fitting joint connector having at least one coped end, the shape of said coped end being structured to conform with the outside diameter of said length of rail, whereby said coped end abuts the outer portion of said rail;
an opening in said length of rail;
a threaded opening in said insert in alignment with said opening in said rail;
an annular shoulder formed on an inner surface of said coped fitting joint connector; and, a threaded fastener and an engaging means engaging said annular shoulder whereby said threaded fastener is inserted within said rail opening and threaded into said threaded opening in said insert while said engaging means engages said annular shoulder to form a connection between said coped fitting joint connector and said rail.

22. The connection of claim 21 wherein said engaging means is an annular washer.

23. A security railing system comprising:
a plurality of elongated rails;
end support means connecting opposite ends of said elongated rails;
at least one center post spaced from said end support means and formed by a plurality of individual coped sections; said individual coped sections being mounted in line, one above the other and fit between adjacent spaced rails to maintain the rails spaced apart;
means for connecting said individual coped sections to maintain the sections rigid and in line each with respect to the others;
a rabbet joint connection for connecting linear sections of said elongated rails;
said rabbet joint connection including a first section of rail having an outer annular milled surface;
a second section of rail having an inner annular milled surface, the diameter of the outer annular milled surface being complementary with the diameter of the inner annular milled surface whereby the milled ends of said first and second sections of said rail are telescopically fit together;
a first inner rigid reinforcing sleeve positioned within the end and reinforcing said first rail section and a second inner rigid reinforcing sleeve positioned within the end and reinforcing said second rail section; and wherein
said reinforcing sleeves each having ends which abut the other when said rail sections are interconnected.

* * * * *